United States Patent [19]

Maxwell

[11] Patent Number: 4,762,192

[45] Date of Patent: Aug. 9, 1988

[54] BEAM HAULER FOR TRUCKS

[76] Inventor: Carroll B. Maxwell, P.O. Box 17184, Orlando, Fla. 32860

[21] Appl. No.: 948,088

[22] Filed: Dec. 31, 1986

[51] Int. Cl.⁴ ............................................. B62D 59/04
[52] U.S. Cl. ................................... 180/14.2; 280/404
[58] Field of Search ............... 280/404, 407; 180/14.1, 180/14.2, 134

[56] References Cited

U.S. PATENT DOCUMENTS

| | | | |
|---|---|---|---|
| 3,254,903 | 6/1966 | Rodney | 280/407 |
| 3,438,652 | 4/1969 | Hoffacker | 280/423 A |
| 3,479,055 | 11/1969 | Cunha et al. | 280/407 |
| 4,031,976 | 6/1977 | Lambert | 180/14.1 |

Primary Examiner—John A. Pekar
Attorney, Agent, or Firm—James H. Beusse

[57] ABSTRACT

An extended assembly including at least one fore-trailer, a steering dolly and at least one aft-trailer. The fore-trailer has a longitudinally adjustable and pivotal connection between its forward end and a tractor. At least one longitudinally adjustable wheel assembly provides support for the rear of the fore-trailer where there also is a longitudinally adjustable, pivotally mounted load transfer assembly for supporting the forward end of a long massive load. The rear of the load is supported by an aft-trailer and a steering dolly. The steering dolly supports the forward end of the aft-trailer through a longitudinally adjustable pivotal connection while at least one longitudinally adjustable wheel assembly supports the rear of the aft-trailer. The front of the dolly is supported by steerable wheels and the rear is supported by a longitudinally adjustable wheel assembly. Between the forward and rear wheel assemblies of the dolly is a vertically adjustable drive wheel assembly for providing independent propulsion to the rear of the load and for further distributing the rear load. The steering mechanism of the dolly is controlled by a steering wheel on the aft-trailer.

11 Claims, 4 Drawing Sheets

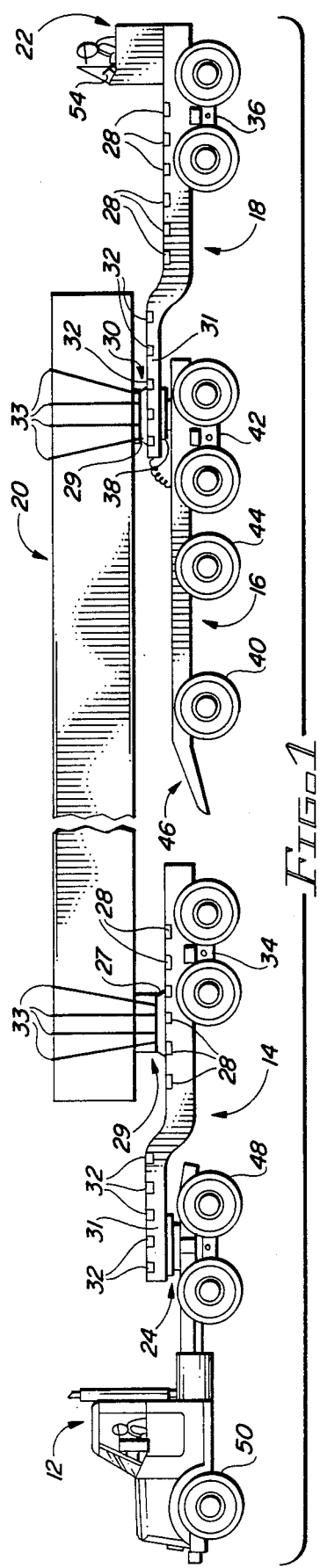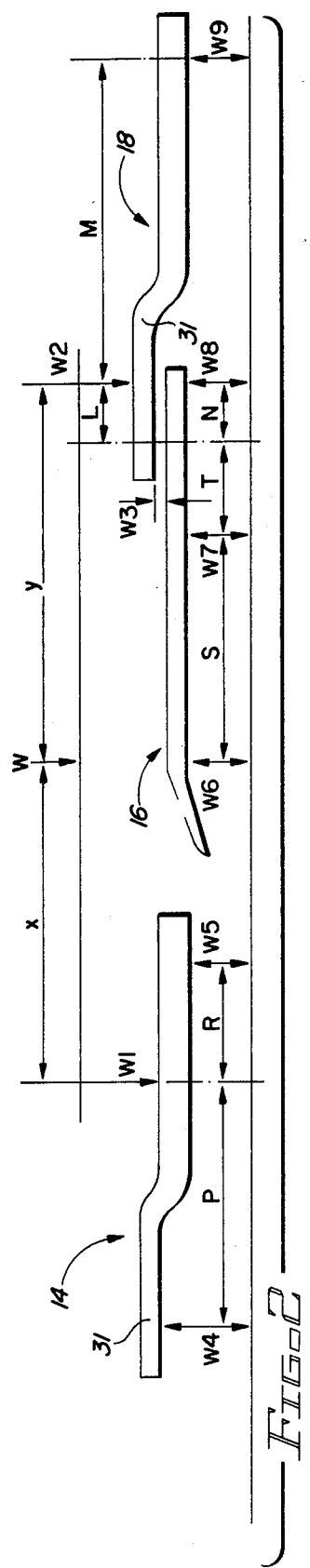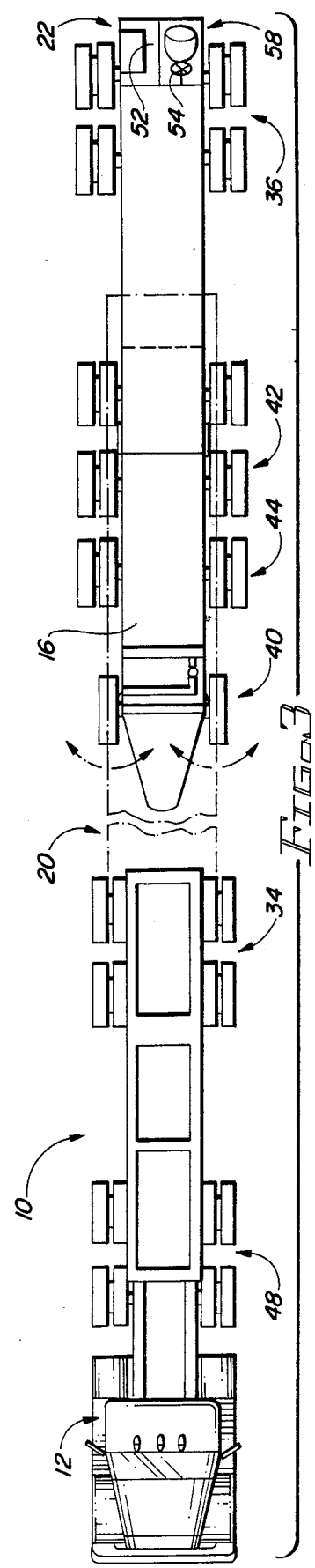

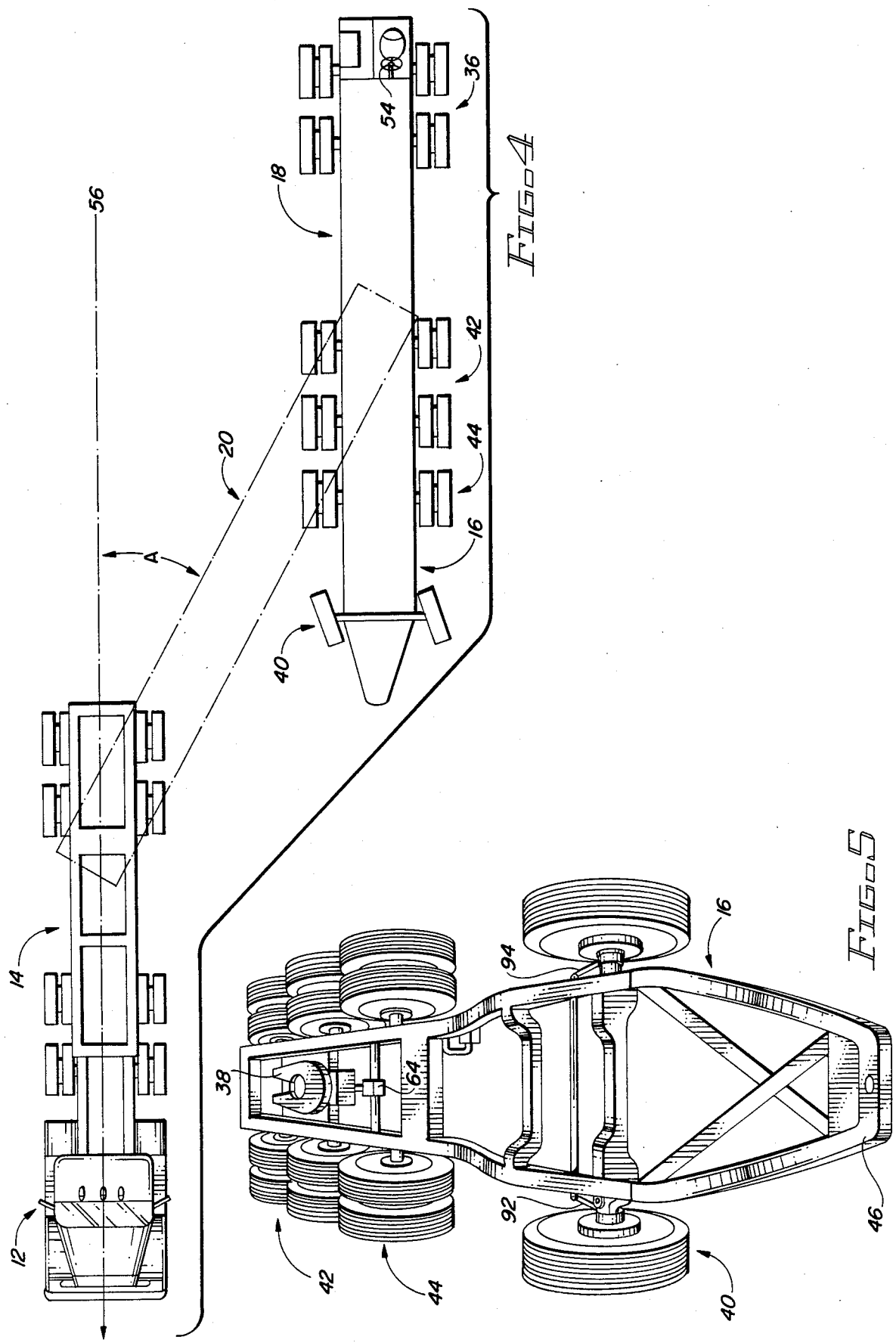

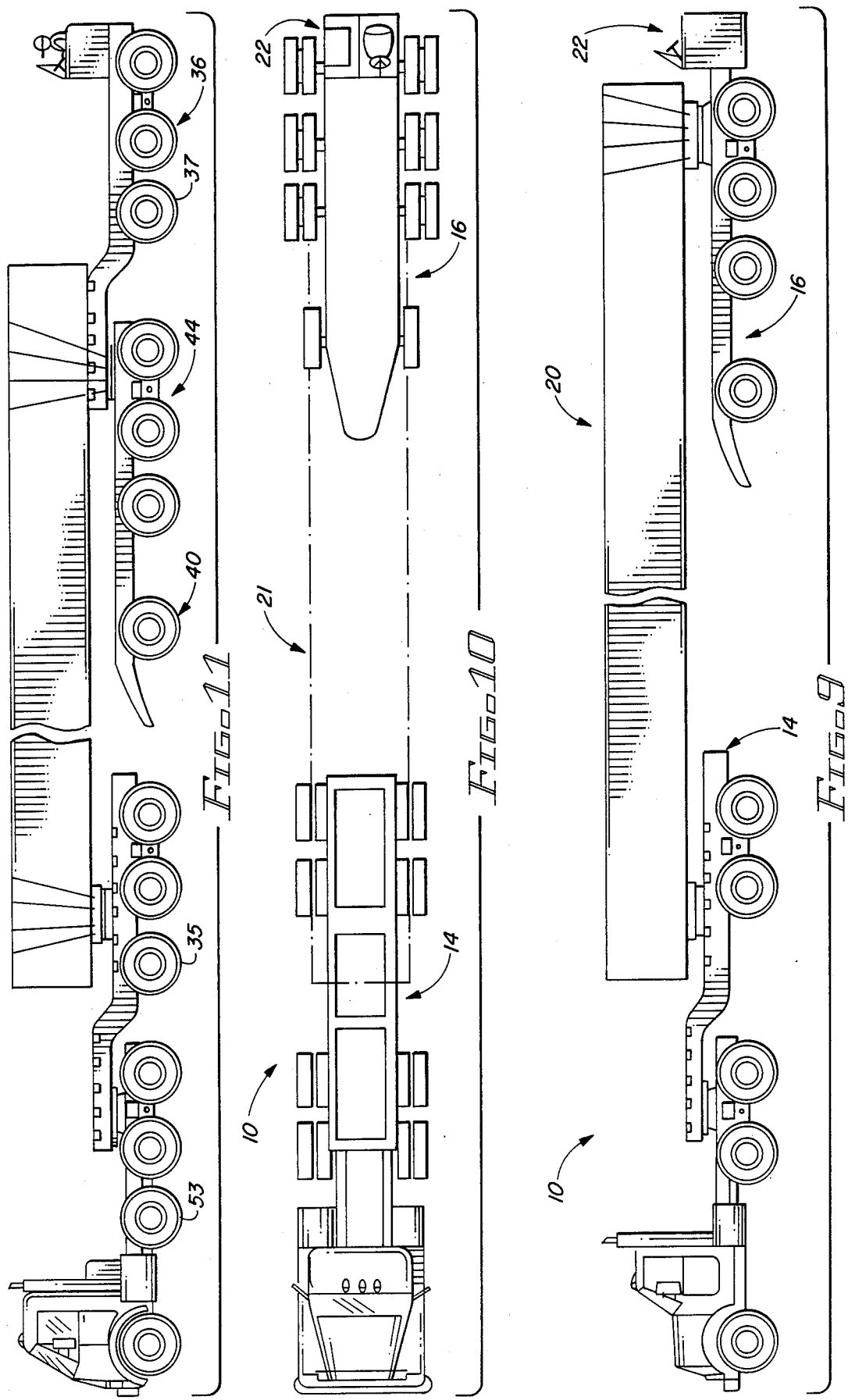

BEAM HAULER FOR TRUCKS

FIELD OF THE INVENTION

This invention relates to on-road vehicles fo transporting very heavy elongated loads and in particular to a vehicle having a steerable trailer for enhanced over the road maneuverability and load distribution.

BACKGROUND OF THE INVENTION

Current structural designs for bridges, buildings and supporting spans for elevated rail systems often require elongated, pre-stressed structural beams. Increasingly, massive structures exceeding 160 feet in length and 160,000 lbs. must be moved from manufacturing sites to construction areas over state and federal highways. Because of road safety and weight limitations state and federal authorities have adopted highway weight distribution formulae and regulations which determine legal load limits for load carrying vehicles, the manner in which the load carrying vehicles may traverse a highway, and the weight distribution of load-carrying vehicles over the pavement. Typically these weight distribution formulae are used to prescribe load limits for individual axles or axle clusters and the distribution of the load weight over the pavement.

Very heavy loads exceeding the regulated weight limits often require special permits from state authorities. Although criteria for these permits may vary from state to state the load-carrying vehicles must normally comply with a distribution formula determined by the government authorities for safe travel across highways.

Another common problem is the hauling of massive loads over bridges. Loads normally cannot traverse a bridge span when they exceed 60,000 lbs. per span. A third problem associated with load-carrying vehicles known in the prior art occurs when the load, e.g. a beam, is moved on to the construction site. Beams and trusses must be accurately positioned so that cranes can lift them without the danger of tipping. In the past it has at times been an arduous and time consuming task to accurately position a long load in order for cranes or other equipment to grasp the load and situate it in its final position. Another problem is the limited speed of vehicles transporting these heavy loads. Since delays in major construction projects often result in substantial cost impacts it is particularly important that beams move under the safest, fastest possible means from the manufacturing site to the construction site.

With recent increases in the length and mass of precast structures, attempts in the prior art to solve these or similar problems for smaller loads are not applicable to structures exceeding 160,000 lbs. Examples of prior art applicable to transporting smaller loads include U.S. Pat. Nos. 2,741,489; 3,438,652; and 4,441,730. U.S. Pat. No. 3,438,652 discloses a snobble trailer which provides a steerable aft dolly having only three steering positions. U.S. Pat. No. 4,441,730 requires a connectable, trailerable device for steering the aft end. U.S. Pat. No. 2,741,489 also requires a connection from the aft to the fore-trailer to provide steering. Notwithstanding these and other advances in the prior art, it is desirable to have a safer and more efficient load-carrying vehicle for transporting structural members exceeding 160 feet in length and 150,000 lbs. This invention has been developed for the purpose of obviating the aforesaid limitations of the prior art.

SUMMARY OF THE INVENTION

Among the several objects of the invention may be noted the provision of an improved load-carrying vehicle capable of being pulled by a tractor truck or other prime mover and which overcomes the disadvantages and undesirable features discussed above as well as others with respect to the prior art; the provisions of such improved load-carrying vehicle having in one form of the invention a fore-trailer, an aft-trailer, and a steering dolly; the provisions of one embodiment of such improved load-carrying vehicle including a capability for distributing loads weighing as much as 290,000 lbs. among the axle assemblies of the load-carrying vehicle, the provisions of such improved load-carrying vehicle including a maneuverability commensurate with commonly used single trailer load-carrying vehicles; the provisions of such improved load-carrying vehicle having a steering dolly capable of independently maneuvering the aft-trailer of the vehicle in coordination with the fore-trailer; the provisions of such improved load-carrying vehicle having the capability of transporting heavy massive beams over a highway system safely and quickly; the provisions of such improved load-carrying vehicle having the capability of transporting long and massive beams across parallel bridge structures; the provisions of such improved load-carrying vehicle including the ability to extend load distributions in order to comply with load distributions over individual bridge spans; the provisions of such improved load-carrying vehicle including independent rear propulsion and precise maneuverability for negotiating turns and for positioning the vehicle prior to loading and unloading massive beams; and the provisions of such improved load-carrying vehicle including reconfigurable components in order to efficiently transport various massive loads which differ in physical size, weight and mass distribution, the load-carrying vehicle including a plurality of fore-trailers and aft-trailers in an alternative embodiment of the invention. It is another object of the present invention to provide a load-carrying vehicle having an independent steering apparatus at the rear of the vehicle for continuous positional control of the aft-trailer thus providing maximum control when steering the vehicle around turns and when positioning the vehicle for loading and unloading operations. These as well as other objects and advantageous features of the present invention will be in part apparent and in part pointed out hereinafter.

In general, in a trailer assembly for moving heavy, massive structural beams or the like, the trailer assembly includes at least one fore-trailer, a steering dolly and at least one aft-trailer. The fore-trailer has longitudinally adjustable coupling means providing a pivotal connection between the forward end of the fore-trailer and a prime mover such as a tractor truck. At least one longitudinally adjustable wheel assembly provides support for the rear end of the fore-trailer. At the rear of the fore-trailer there also is a longitudinally adjustable pivotally mounted load transfer assembly for supporting the forward end of a long massive load. The aforementioned longitudinally adjustable assemblies asso-ciated with the fore-trailer comprise an adjustable load transfer assembly for the forward end of the load.

The rear of the load is supported by an aft-trailer and a steering dolly which together comprise an adjustable load transfer assembly for the rear end of the load. The steering dolly supports the foreward end of the afttrailer by a longitudinally adjustable pivotal connection while at least one longitudinally adjustable wheel assembly supports the rear of the aft-trailer. The front end of the steering dolly is supported by steering wheels for guiding the dolly and aft-trailer. The rear end of the dolly is supported by a longitudinally adjustable wheel assembly. Located between the forward and rear wheel assemblies of the dolly is a vertically adjustable drive wheel assembly for providing independent propulsion to the rear end of the load and for further distributing the rear load. The steering mechanism of the dolly is controlled by a steering wheel situated on the rearward portion of the aft-trailer and operable by a rear driver stationed on the aft-trailer. The rear driver may also remotely control the drive wheels located on the dolly to assist in maneuverability and alignment when negotiating turns, when placing loads on the vehicle and when situating loads for removal at construction sites.

BRIEF DESCRIPTION OF THE DRAWINGS

FIG. 1 is a side-view illustrating a preferred embodiment of the inventive load-carrying vehicle including the positions of the vehicle's wheel assemblies;

FIG. 2 illustrates generally the distribution of a load among the wheel assemblies shown in FIG. 1.

FIG. 3 is a top elevational view of FIG. 1.;

FIG. 4 is a top view of FIG. 1 illustrating the maneuverability of the steering dolly and aft-trailer;

FIG. 5 is a front elevational view of the steering dolly;

FIG. 9 is a side view of a second embodiment of the load-carrying vehicle having only a fore-trailer and an aftsteering dolly;

FIG. 10 is a top view of the alternative embodiment illustrated in FIG. 11; and

FIG. 11 illustrates inclusion of supplemental wheel assemblies which may be found in alternate embodiments of the invention.

DETAILED DESCRIPTION OF AN ILLUSTRATIVE EMBODIMENT

General Description

Figure 6:
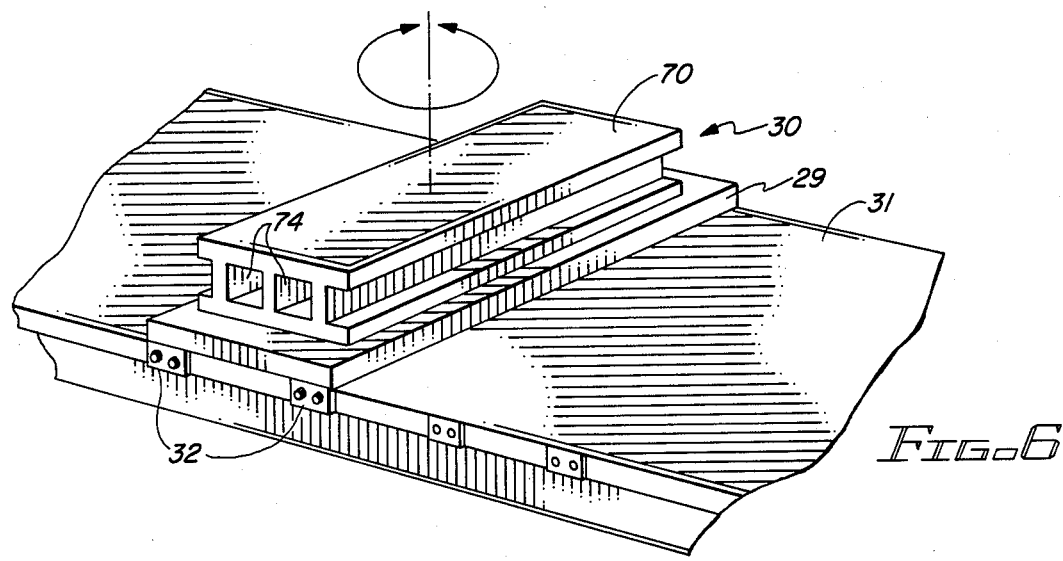
FIG. 6 is a side perspective view illustrating a pivotally connected bolster for supporting the load of a beam.

With reference to the drawings in general there is illustrated in a preferred embodiment the inventive load-carrying vehicle 10 associated with a prime mover 12 such as a tractor truck and comprising a trailer assembly having a fore-trailer 14, a steering dolly 16 and an aft-trailer 18. This load-carrying vehicle 10 is designed for carrying a very long and massive load 20, such as a structural beam greater than 160 feet in length and weighing in excess of 160,000 lbs. The fore and aft trailers, commonly known as gooseneck trailers, comprise elongated forward connecting ends 31 hereinafter referred to as goosenecks. The fore-trailer, the aft-trailer and the steering dolly each have longitudinal adjustment assemblies for varying the weight distribution of the load 20 in order to adjust load variations between wheel assemblies and fully conform to state and federal highway weight limitations. The fore-trailer and aft-trailer are each pivotally connected to tractor 12 and steering dolly 16 respectively by coupling means 24 and 38 commonly known in the art as sliding fifth wheels.

Novel features of the current invention include the manner in which the load is supported and the manner in which the fore-and aft-trailers are coupled during transport. It is believed that these unique features provide a novel means for achieving maneuverability during transport and a greater flexibility for handling various sized loads than has been known in the prior art. In the past structural loads such as beams have been transported on the load beds of trailer assemblies and have also been used to rigidly couple trailer assemblies together. However, in the present invention the fore and aft-trailers are pivotally coupled to each other by the load itself. With reference to FIG. 1, fore-longitudinally adjustable pivotal load transfer means 27 provides pivotal support for the forward end of load 20 on fore-trailer 14. An aft-longitudinally adjustable pivotal load transfer means 30 provides pivotal support for the rear portion of load 20 on aft-trailer 18. A plurality of chains 33 are used to secure each end of the load to its corresponding pivotal load transfer means 27 and 30. Thus there is disclosed a method of transporting a structural load while it is supported at as few as two points by the load carrying vehicle.

Steering dolly 16 supports the gooseneck 31 of aft-trailer 18 and is independently steered from an operator position in rear driver console 22 located at the rear of aft-trailer 18. In operation, with a tractor truck 12 providing propulsion for the load-carrying vehicle, the structural strength and mass of the load 20 transfers the forward thrust of the tractor truck from the fore-trailer 14 through the load 20 to the aft-trailer 18 and steering dolly 16. A rear driver may control the steering position of the wheel assembly 40 of the steering dolly in a manner similar to the way a driver controls the front wheel assembly 50 of the tractor truck 12. The rear driver is able to maneuver the steering dolly and aft-trailer in combination such that the load can swing 90° to the left or right with respect to the longitudinal axis of the fore-trailer. This maneuverability allows placement of the load in any desired position with relative ease.

In a preferred embodiment of my invention and with reference to FIG. 1 there is shown a side perspective of fore-trailer 14, steering dolly 16 and aft-trailer 18 with certain details having been omitted for clarity. Tractor truck 12 is pivotally connected to fore-trailer 14 by a longitudinally adjustable pivotal coupling means which, in the preferred embodiment, includes a sliding fifth wheel 24 for supportively coupling the gooseneck 31 of fore-trailer 14 to the tractor truck at one of several selectable king pin positions (not illustrated) located on the gooseneck. In the preferred embodiment of the invention this coupling means, and other coupling means discussed below which also include fifth wheels, comprises three king pin positions spaced two feet apart. The fifth wheels will slide up to two feet in the "forward or rearward" (hereafter "longitudinal") direction about a center position in order to provide further flexibility in load distribution. The inventor has found that a sliding fifth wheel having as few as three longitudinally adjustable king pin positions (not illustrated) spaced two feet apart in the gooseneck of the fore-trailer, in combination with the fore-longitudinally adjustable pivotal load transfer means comprising a pivotal coupling plate 29, and adjustable wheel assembly 34, provide adequate flexibility for the distribution of load weight between tractor truck 12 and fore-trailer 14 in order to meet the objectives of the invention. Fore-longitudinally adjustable load transfer means, comprising a pivotal coupling plate 29 and pin (not shown), is longitudinally adjustable on the rear portion of fore-trailer 14 by movement of the pivotal coupling plate 29 and pin among a plurality of bolting flanges 28, thus providing an additional means of distributing the load.

The rear portion of load 20 is supported by the aft-longitudinally adjustable pivotal load transfer means 30 comprising a second pivotal coupling plate 29, which in combination with a second pin (not shown), has a longitudinally adjustable position among a plurality of bolting flanges 32 which are securely fastened on the gooseneck 31 of aft-trailer 18. In the preferred embodiment of the invention each pivotal coupling plate 29 is a swivel plate which may be longitudinally adjusted over an 8-foot range among a plurality of bolting flanges 28 or 32.

Fore-trailer 14 includes a longitudinally adjustable tandem wheel assembly 34 for varying the weight distribution of load 20 on wheel assemblies 34, 48 and 50. Aft-trailer 18 also includes a longitudinally adjustable tandem wheel assembly 36 for varying the weight distribution of load 20 on the assemblies 36, 40, 42 and 44. Situated at the rear of aft-trailer 18 is a steering and drive control station 22 operable by a rear driver for control of steerable wheel assembly 40 on dolly 16.

In the preferred embodiment of the invention steering dolly 16 is pivotally connected to aft-trailer 18 by a longitudinally adjustable pivotal coupling means including a sliding fifth wheel 38 for coupling and supporting gooseneck 31 of aft-trailer 18. The attachment position between the sliding fifth wheel 38 and aft-trailer gooseneck 31 is longitudinally adjustable along three king pin positions (not illustrated) spaced two feet apart thus providing an eight foot range of adjustment. Steering dolly 16 is supported by front wheel assembly 40, longitudinally adjustable tandem wheel assembly 42 and vertically adjustable drive wheel assembly 44. Wheel assembly 42 is longitudinally adjustable in order to vary the weight distribution of the load among the dolly wheels. Wheel assembly 44 is vertically adjustable in order to further distribute load 20. It is controllable by an air valve (not shown) in rear driver console 22 in a manner well known in the art. As will be further discussed herein wheel assembly 44 may be hydraulically powered to provide propulsion to the steering dolly 16 independent from tractor truck 12. Steerable wheel assembly 40 is controllable from a steering wheel 54 in rear driver console 22 for effecting continuous turning control of aft-trailer 18. The fore portion of steering dolly 16 includes a hitching assembly 46 for hauling the steering dolly back to the point of origination after delivering load 20.

As is evident from FIG. 1 the fore-trailer and aft-trailer are interchangeable. In particular, fore-trailer 14 can be positioned as aft-trailer 18 by disconnecting rear driver console 22 from the aft-trailer and connecting it to the rear portion of the fore-trailer. Pivotal coupling plate 29 can be quickly unbolted from flanges 32 and bolted to similar flanges on the gooseneck of the fore-trailer. The fore-trailer contains the necessary hydraulic lines and air pressure lines running from the rear of the trailer to the fore portion of the trailer to connect to the steering dolly. In a similar manner, aft-trailer 18 can be positioned as fore-trailer 14 by interchanging load transfer means 27 and 30 and rear driver console 22. The invention provides a maximum amount of interchangeability and flexibility to be obtained with a minimal number of different components.

This novel combination of longitudinal adjustment assemblies for fully controlling the weight distribution of a vehicle carrying massive loads provides a means for strict compliance with state and federal load limits, load distribution formulae and overload permits. Weight from load 20 is transmitted to wheel assemblies 50, 48, 34, 36, 40, 42 and 44. With load 20 placed upon fore-trailer 14 and aft-trailer 18 weight distribution on each wheel assembly may be proportionately varied by the above-described longitudinal adjustment assemblies as a function of the respective distances between the various wheel assemblies and the distance between the center of mass of load 20 and each load transfer means 27 and 30. This functional relationship may be expressed algebraically. By way of example, with reference to FIG. 2 in the preferred embodiment of the invention the sliding fifth wheels 24 and 38 may be adjusted to maintain a fixed load of 10,000 lbs. on both the front wheel assembly 50 of tractor truck 12 and wheel assembly 40 of the steering dolly. Referring to FIG. 11, it is also noted that two other flexible features are associated with an alternate embodiment of the invention. First, tractor truck 12 may be of the type which accommodates an additional (optional) wheel assembly 53 rearward or forward of wheel assembly 48. Similarly each gooseneck trailer may accommodate an additional wheel assembly e.g. 35 and 37. The second flexible feature is the connection of additional gooseneck trailers (not illustrated) between the tractor 12 and fore-trailer 14 and between the steering dolly 16 and aft-trailer 18. Each of these variable features provides supplemental means to further distribute exceptionally heavy loads over a roadway in order to meet regulatory limits.

As illustrated in FIG. 2, W represents the total weight of load 20. $W_1$ corresponds to the portion of W which is transferred through support 26 to fore-trailer 14 and tractor truck 12 while $W_2$ corresponds to the portion of W transferred through pivotal coupling plate 29 to steering dolly 16 and aft-trailer 18. $W_4$ represents the portion of $W_1$ transferred to wheel assemblies 48 and 50. $W_5$ represents the portion of $W_1$ carried by wheel assembly 34. $W_3$ corresponds to the portion of $W_2$ transferred through coupling means 38 to steering dolly 16. As further illustrated in FIG. 2 $W_6$ represents the portion of $W_2$ carried by wheel assembly 40; $W_7$ represents the portion of $W_2$ carried by wheel assembly 44; $W_8$ represents the portion of $W_2$ carried by wheel assembly 42; and $W_9$ represents the portion of $W_2$ carried by wheel assembly 36. The letters X and Y represent the distances from the center of mass for load 20 to the longitudinally adjustable pivotal load transfer means 27 and 30 at which $W_1$ and $W_2$ are transferred respectively. M represents the longitudinal distance between aft load transfer means 30 and wheel assembly 36. L represents the distance between aft load transfer means 30 and coupling means 38. S represents the distance between wheel assemblies 40 and 44. T represents the longitudinal distance between coupling means 38 and the vertically adjustable wheel assembly 44. N represents the longitudinal distance between coupling means 38 and wheel assembly 42. P represents the longitudinal distance between load transfer means 27 and wheel assembly 48; and R represents the longitudinal distance between forelongitudinally adjustable pivotal load transfer means 27 and wheel assembly 34.

Given these parameters, the portions of the total load W transferred to the pavement through the various wheel assemblies may be expressed algebraically. For example:

$$W_1 = \frac{y}{x+y} W$$

$$W_2 = \frac{x}{x+y} W$$

$$W_3 = \frac{M}{L+M} W_2$$

$$W_4 = \frac{R}{P+R} W_1$$

$$W_5 = \frac{P}{P+R} W_1$$

$$W_6 = \frac{N}{(S+T)+N} W_3, \text{ for } W_7 = 0$$

$$W_9 = \frac{L}{L+M} W_2$$

Other formulae may be developed which take into consideration load distribution on wheel assembly 50 as well as $W_7$ and $W_8$. While use of these formulae is not required in the practice of the invention, these formulae do illustrate that the weight of load 20 can be distributed over a large area of the pavement and the weight on each wheel assembly can be balanced accordingly. The unique constructon and novel method of the present invention is clearly evident from the formulae listed above and from FIG. 2. For instance, the weight on wheel assembly 40 can be adjusted among a large range of values depending upon the position of connection between the load and aft-trailer 18 and the vertical position of wheel assembly 44. As is evident from FIG. 2, the weight on each wheel assembly can be adjusted by varying the distances between respective weights. For instance, distance Y is adjusted by sliding pivotal coupling plate 30 longitudinally on the forward portion of aft-trailer 18. Distance X is adjusted by longitudinally positioning pivotal coupling plate 29 on the rear portion of fore-trailer 14. R is adjusted by moving wheel assembly 34 in a longitudinal direction. In the preferred embodiment, wheel assemblies 48, 34, 42 and 36 are longitudinally adjustable tandem axle clusters which are well known in the art. Distance P is adjusted by moving the gooseneck of fore-trailer 14 with respect to fifth wheel 24. L is adjusted by positioning pivotal coupling plate 29 on the forward portion of aft-trailer 18. M is adjusted by longitudinally moving either pivotal coupling plate 29 or wheel assembly 36. N is adjusted by longitudinally positioning wheel assembly 42. T and S remain constant but the combination (S+T) can be changed by moving the dolly with respect to aft-trailer 18. This corresponds to positioning the aft-trailer 18 longitudinally with respect to fifth wheel 38. $W_6$ and $W_7$ can be modified by vertically adjusting wheel assembly 44 for effecting a weight distribution on wheel assembly 44. FIG. 3 illustrates the positioning of load 20 (shown by phantom lines) on load-carrying vehicle 10. As is evident in FIG. 3, load 20 may be distributed over a plurality of wheel assemblies in order to adjust the load distribution over the pavement.

Referring now to FIG. 3, rear driver console 22 includes an equipment bay 52 and a driver's compartment 58. Compartment 58 includes a steering wheel 54 for effecting hydraulic steering of wheel assembly 40. This novel use of a hydraulic steering system enables the driver to steer wheel assembly 40 on steering dolly 16 from aft-trailer 18 through hydraulic lines. Turning steering wheel 54 in one direction results in corresponding continuously controllable pivotal motion to wheel assembly 40 thus effecting a change in direction of steering dolly 16. Since load 20 is pivotally connected to the trailers 14, steering dolly 16 can be steered to create an angular displacement of load 20 with respect to the longitudinal axis 56 of fore-trailer 14. This is evident in FIG. 4 which corresponds to the operator turning steering wheel 54 to the left thus causing steering dolly 16 to move to the left of longitudinal axis 56. Angle A represents the angular displacement of load 20 with respect to the longitudinal axis 56. In operation, when angle A reaches 90° on either side of axis 56 load 20, although oriented transverse to the direction of travel along a highway, may nevertheless be carried along the highway. This inventive feature is believed to be unique with respect to the prior art and of great importance in moving massive loads over bridges when the loading on a single bridge span would exceed regulated limits, but where the simultaneous loading of parallel bridge spans would result in permissible load levels. For example, the present invention may be used to transport a beam over parallel bridges by moving the steering dolly such that when A reaches 90° the load 20 is transported over both bridges by driving the fore-trailer over one bridge span while driving the aft-trailer and dolly over the other bridge span. The advantage of this improved load-carrying vehicle's maneuverability is also demonstrated by using both the tractor and the steering dolly to adjust load 20 in various positions for enabling a situated crane to grasp and remove the load at a construction site. It is believed necessary at times to supplement the maneuverability provided by the steerable wheel assembly 40. This is evident, for example, when negotiating 90° turns and when positioning the vehicle prior to loading and unloading massive beams. In each of these instances it may be necessary to move afttrailer 18 in a direction which is transverse to the direction of fore-trailer 14 or tractor truck 12. Therefore steering dolly 16 is capable of being powered independently of tractor truck 12. In the preferred embodiment of the invention vertical wheel assembly 44 is hydraulically powered. Thus, when tractor 12 and fore-trailer 14 are at rest, the propulsion of wheel assembly 44 and steering of wheel assembly 40 from rear driver console 22 allows exceptionally long loads to be positioned with ease and control not previously available. For instance, with reference to FIG. 4, while tractor 12 and fore-trailer 14 are at rest, load 20 can be maneuvered to exceed 90° to the right or left of axis 56. This additional propulsion allows the beam to be more precisely maneuvered for gripping by a crane. The propulsion of steering dolly 16 also allows the steering and aft-trailers to be moved away from the load after it is lifted by cranes.

Fore- and Aft-trailer

The fore- and aft-trailers are goose-neck trailers having forward connecting ends referred to as goosenecks 14, 31 and which are slightly elevated above the remainder of each trailer. As noted above, the fore- and aft trailers are equivalent and can be interchanged by moving appropriate coupling means. As also noted above, because of this equivalence, additional gooseneck trailers may be coupled either behind the tractor 12 or behind the steering dolly. FIG. 6 illustrates various details of the fore-and aft-trailers. Since the fore-and aft-trailers are the same, it is to be understood that the following description of the aft-trailer also applies to the fore-trailer and any other gooseneck trailers which are incorporated into the invention.

Aft-longitudinally adjustable pivotal load transfer means 30 comprises a pivotal coupling plate or swivel plate 29 mounted on the goose-neck 31 to effect pivotal movement of the load 20. In the practice of this invention, the inventor has found that the support coupling means works best with a swivel plate 29 and pin (not illustrated) connected to a bolster 70 as are commonly used in the art for supporting loads. Load transfer means 30 is longitudinally adjustable along the gooseneck. For a fore-trailer, pivotal coupling plate 29, e.g., a swivel plate is bolted to the rear portion of the fore-trailer and is adjustable along the longitudinal axis of the fore-trailer.

FIG. 6 shows a side view of the load transfer means 30 including a swivel plate 29 which can be bolted to any of a plurality of flanges 32 spaced approximately one foot apart along the side of aft-trailer 18. By unbolting swivel plate 29 and moving it longitudinally forward or backward, the load distribution between the trailers 18 and the supporting carriage is modified. Load 20 rests on bolster 70 which includes openings 74 to allow chains to be positioned inside the bolster and securely wrapped around the load. The bolster pivots 360° about swivel plate 72.

Steering Dolly

Figure 7:
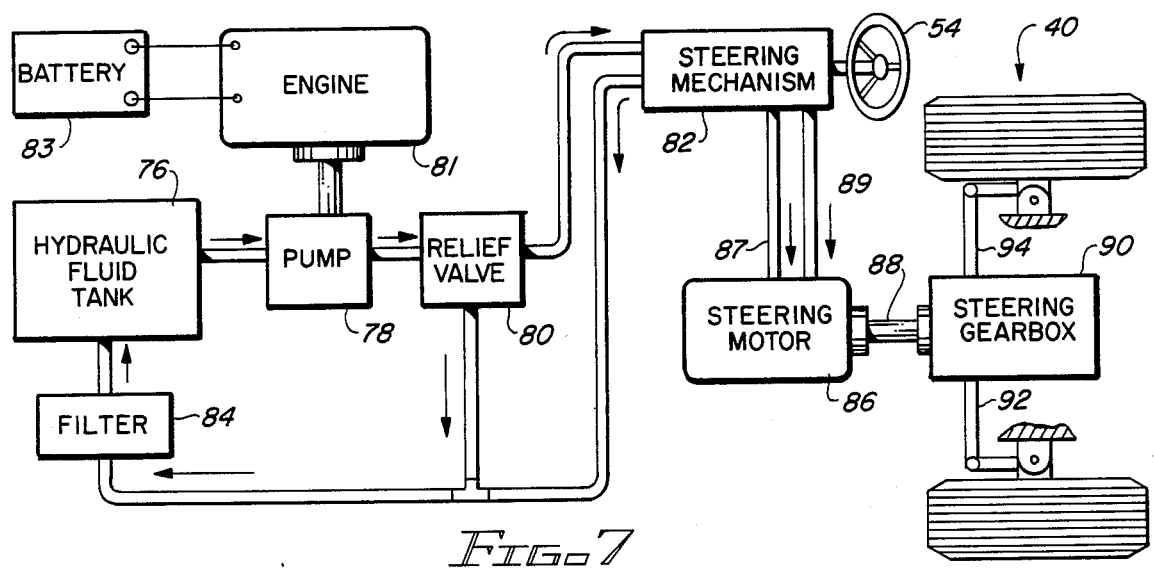
FIG. 7 is a schematic diagram illustrating the rear steering system of the load carrying vehicle.
Figure 8:
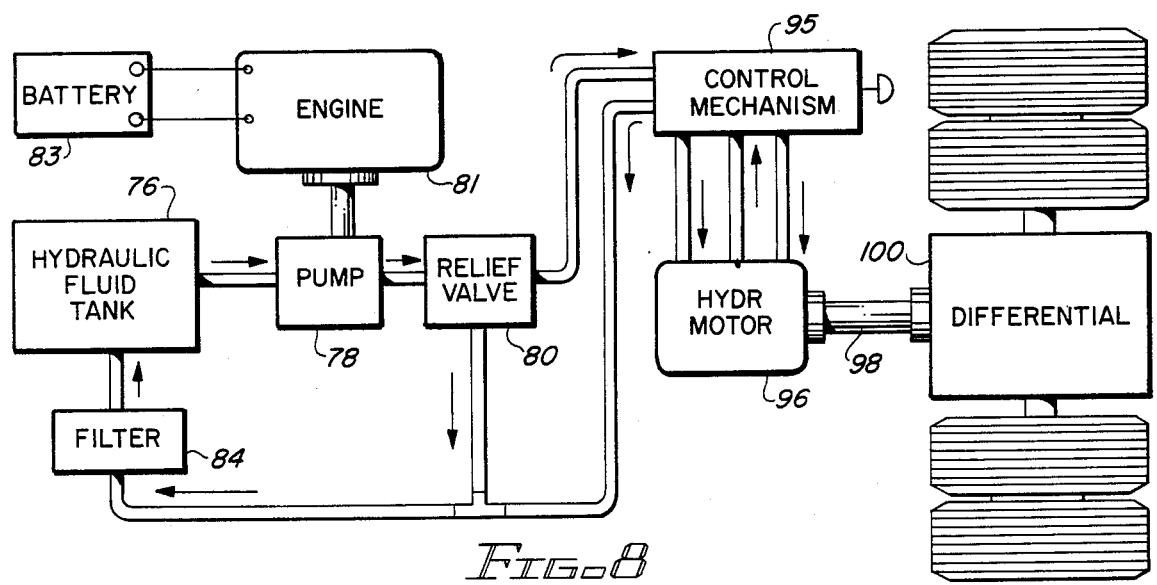
FIG. 8 is a schematic diagram of the rear drive system of the load carrying vehicle.

FIG. 5 illustrates a top front perspective view of steering dolly 16. FIG. 7 illustrates in schematic form the hydraulic steering system by which a rear drive can control wheel assembly 40 in the steering dolly from the aft-trailer. FIG. 8 illustrates schematically the hydraulic operation of rear drive wheel assembly 44.

Both rear steering and drive power are effected by hydraulic means in order to provide unique capabilities to a load-carrying vehicle. A tank 76 located in the equipment bay 52 of the steering console 22 provides hydraulic fluid for operation of the steering and drive systems. With reference to FIG. 9, engine 81 powers pump 78 to feed hydraulic fluid from tank 76 through steering mechanism 82 in order to control steering motor 86 and turn wheel assembly 40. Engine 81 is electrically started by conventional means using battery 83. Relief valve 80 controls the pressure in the hydraulic fluid lines (not shown) by returning excess hydraulic fluid from the system through filter 84 to tank 76 in a manner well known in the art. Steering mechanism 82 is mechanically controlled by steering wheel 54 to provide hydraulic fluid to steering motor 86 dependent upon the positioning of steering wheel 54. When steering wheel 54 is turned to the right or left, fluid is pumped through corresponding right inlet 87 or left inlet 89 of steering motor 86. Steering motor 86 is mechanically linked through steering shaft 88 to steering gear box 90 which includes mechanical linkages 92 and 94 connected to wheel assembly 40. Wheel assembly 40 comprises a standard front axle steering combination well known in the art for turning to the left or right. Pump 78 illustratively may take the form of a gresen gerator pump manufactured by Gearson, Inc. under their designation PGG2-20. Engine 81 may illustratively take the form of a four cylinder diesel unit in order to power both the steering system and the drive system. Steering mechanism 82 may illustratively take the form of an orbitrol steering mechanism manufactured by Charlynn Industries, Corp. under their designation 211-1007. Hydraulic steering motor 86 may illustratively be manufactured by the Charlynn Industries under their designation 101-1003-6. Steering gear box 90 illustratively may be manufactured by Ross, Inc. under their designation T7210290.

One novel feature of the present invention which results from the inclusion of steering dolly 16 is full turning control of aft-trailer 18. Rotation of steering wheel 54 one revolution results in one complete revolution of shaft 88 and the turning of wheel assembly 40 through an angle of approximately 10 degrees. Thus the steering dolly and aft-trailer are as controllable as an independent truck. The steering dolly can be easily maneuvered along the highways allowing the load-carrying vehicle to exceed speeds greater than 40 miles per hour. It is this increased maneuverability resulting from the remotely controlled steering dolly which allows the load 20 to be precisely placed for lifting by devices such as cranes. In addition, the hydraulic lines can be quickly connected and disconnected for effecting immediate replacement of the dolly or aft-trailer.

Hydraulic lines for steering control as well as drive operation of steering dolly 16 include quick connect-/disconnect features between the aft-trailer 18 connected to steering dolly 16 enabling removal of the aft-trailer from the steering dolly for replacement with a different aft-trailer. In an alternate embodiment the rear driver console 22 can be physically attached to the steering dolly when carrying lighter loads as illustrated in FIG. 9.

Steering Dolly Rear Wheel Drive System

As noted above, the hydraulic system in one form of the invention can supply hydraulic power for independent propulsion of the steering dolly through wheel assembly 44. For brevity, the same components of the system have been disclosed previously and are not discussed again. As illustrated in FIG. 8, in addition to providing hydraulic fluid to steering mechanism 82, pump 78 also provides fluid to control mechanism 95 which in turn provides fluid to hydraulic motor 96 in order to control the speed and direction of drive wheel assembly 44. Hydraulic motor 96 is mechanically linked to wheel assembly 44 through drive shaft 98 which provides rotational movement to differential 100 for effecting movement in either a forward or reverse direction in a manner well known in the art. An air axle control valve (not illustrated) is included in the rear driver console 22 for adjusting the vertical height of wheel assembly 44 on the steering dolly, in a manner well known in the art.

FIG. 9 shows an alternate embodiment of the present invention in which aft-trailer 18 is eliminated from load-carrying vehicle 10. In this embodiment fore-trailer 14 is as aforedescribed. Aft-trailer 18 is uncoupled from steering dolly 16 and the rear driver console 22 is removed from the aft-trailer. Since the hydraulic and air lines are provided with quick connect/disconnect connectors the rear driver console 22 is easily removed from the aft-trailer and quickly mounted on the steering dolly. This configuration is used for hauling lighter loads. The advantage of this embodiment is increased maneuverability. The steering and independent drive features of the steering dolly as mentioned before are implemented in this alternate embodiment as well.

FIG. 10 shows a view from above of the embodiment illustrated in FIG. 9. There is shown a load 20 on the fore-trailer 14 and steering dolly 16. Load 20 is connected to the fore-trailer and steering dolly by coupling means as mentioned before having chains 33 wrapped around the load to secure it in place. Notably, the fifth wheel of the steering dolly found in the preferred embodiment has been replaced by a swivel plate and bolster (not shown) from the aft-trailer for effecting pivotal movement of the rear end of load 20 on steering dolly 16.

In conclusion, there has been shown a load-carrying vehicle meeting the objects and advantageous features as previously set forth in the disclosure. As is evident from this disclosure the load-carrying vehicle is able to haul extremely heavy loads over a highway while meeting weight distribution regulations. The steering dolly of the load-carrying vehicle provides maneuverability in order for the vehicle to accomplish both the functions of moving loads quickly over highways and precisely maneuvering loads for hoisting with cranes or the like.

The above described embodiments of the invention are illustrative only, and therefore modifications thereof may occur to those skilled in the art. Accordingly, this invention is not to be regarded as limited to the embodiments disclosed therein, but is to be limited as defined by the appended claims.

I claim:

1. A trailer assembly for supporting the weight of a load and for transporting the load over a highway, said trailer assembly being releasably coupled to a prime mover having load bearing wheels, said trailer assembly comprising:
    a fore-trailer for supporting a first end of the load, said fore-trailer comprising at least a first wheel assembly, said fore-trailer being supported by at least the load bearing wheels of the prime mover and said first wheel assembly;
    an aft-trailer for supporting a second end of the load, said aft-trailer comprising at least a second wheel assembly;
    dolly means for steering said aft-trailer, said dolly means comprising at least a third wheel assembly and a fourth wheel assembly said dolly means being supported by at least said third and fourth wheel assemblies and said aft-trailer being supported by at least said second wheel assembly and said dolly means, said dolly means further comprising drive means for providing rear drive propulsion of said steering dolly independent of the prime mover
    longitudinal adjustment means located on said for-trailer, said aft-trailer and said doly means for variably distributing the weight of the load upon the load bearing wheels of the prime mover and said wheel assemblies.

2. The trailer assembly of claim 1 wherein said dolly means further comprises steering means for providing full turning control for said aft-trailer 3. A trailer assembly for supporting the weight of a load and for transporting the load over a highway, said trailer assembly being releasably coupled to a prime mover having load bearing wheels, said trailer assembly comprising:
    a fore-trailer for supporting a first end of the load, said fore-trailer comprising at least a first wheel assembly, said fore-trailer being supported by at least the load bearing wheels of the prime mover and said first wheel assembly;
    an aft-trailer for supporting a second end of the load, said aft-trailer comprising at least a second wheel assembly;
    dolly means for steering said aft-trailer, said dolly means comprising at least a third wheel assembly and a fourth wheel assembly, said dolly means being supported by at least said third and fourth wheel assemblies and said aft-trailer being supported by at least said second wheel assembly and said dolly means, said dolly means comprising at least a fifth wheel assembly and a vertical adjustment means for alternately lowering and raising said fifth wheel assembly in order to alternately support said dolly means;
    longitudinal adjustment means located on said fore-trailer, said aft-trailer and said dolly means for variably distributing the weight of the load upon the load bearing wheels of the prime mover and said wheel assemblies, said longitudinal adjustment means comprising first load transfer means for pivotally connecting the first end of the load to said fore-trailer at any of a plurality of longitudinally spaced positions on said for-trailer, and second load transfer means for pivotally connecting the second end of the load to said aft-trailer at any of a plurality of longitudinally spaced positions on said aft-trailer; said longitudinal adjustment means further comprising first longitudinally adjustable pivotal coupling means for supportively coupling said fore-trailer to the prime mover at any of a plurality of longitudinally spaced coupling positions on said fore-trailer, and second longitudinally adjustable pivotal coupling means for supportively coupling said aft-trailer to said dolly means at any of a plurality of longitudinally spaced coupling positions on said aft-trailer;
    said first longitudinally adjustable pivotal coupling means including a first fifth wheel providing pivotal support of said fore-trailer on the prime mover;
    said second longitudinally adjustable pivotal coupling means including a second fifth wheel providing pivotal support of said aft-trailer on said dolly means; said first wheel assembly comprising a first distribution means for adjusting the weight distribution of the load between the prime mover and said fore-trailer;
    said second wheel assembly comprising a second distribution means for adjusting the weight distribution of the load between said dolly means and at least said second wheel assembly; and
    said dolly means comprising dolly distribution means for adjusting the weight distribution of the load between at least said third and fourth wheel assemblies and said aft-trailer.

4. A trailer assembly for supporting the weight of a load and for transporting the load over a highway, said trailer assembly being releasably coupled to a prime mover having load bearing wheels, said trailer assembly comprising:
    a fore-trailer for supporting a first end of the load, said fore-trailer comprising at least a first wheel assembly, said fore-trailer being supported by at least the load bearing wheels of the prime mover and said first wheel assembly;

an aft-trailer for supporting a second end of the load, said aft-trailer comprising at least a second wheel assembly;

dolly means for steering said aft-trailer, said dolly means comprising at least a third wheel assembly and a fourth wheel assembly, said dolly means being supported by at least said third and fourth wheel assemblies and said aft-trailer being supported by at least said second wheel assembly and said dolly means, said dolly means further comprising motor means for maneuvering said aft-trailer, and steering means for providing full turning control of said aft-trailer;

longitudinal adjustment means located on said fore-trailer, said aft-trailer and said dolly means for variably distributing the weight of the load upon the load bearing wheels of the prime mover and said wheel assemblies, said longitudinal adjustment means comprising first load transfer means for pivotally connecting the first end of the load to said fore-trailer at any of a plurality of longitudinally spaced positions on said fore-trailer, and second load transfer means for pivotally connecting the second end of the load to said aft-trailer at any of a plurality of longitudinally spaced positions on said aft-trailer;

said longitudinal adjustment means further comprising first longitudinally adjustable pivotal coupling means for supportively coupling said fore-trailer to the prime mover at any of a plurality of longitudinally spaced coupling positions on said fore-trailer, and second longitudinally adjustable pivotal coupling means for supportively coupling said aft-trailer to said dolly means at any of a plurality of longitudinally spaced coupling positions on said aft-trailer;

said first longitudinally adjustable pivotal coupling means including a first fifth wheel providing pivotal support of said fore-trailer on the prime mover;

said second longitudinally adjustable pivotal coupling means including a second fifth wheel providing pivotal support of said aft-trailer on said dolly means;

said first wheel assembly comprising a first distribution means for adjusting the weight distribution of the load between the prime mover and said fore-trailer;

said second wheel assembly comprising a second distribution means for adjusting the weight distribution of the load between said dolly means and at least said second wheel assembly; and said dolly means comprising dolly distribution means for adjusting the weight distribution of the load between at least said third and fourth wheel assemblies and said aft-trailer.

5. The trailer assembly of claim 4 wherein said aft-trailer further comprises rear console means for controlling said dolly means, said console means including first control means for steering sadi dolly means, second control means for operating said vertical adjustment means and third control means for operating said motor means.

6. A trailer assembly for supporting the weight of a load and for transporting the load over a highway, said trailer assembly being releasably coupled to a prime mover having load bearing wheels, sadi trailer assembly comprising;

a fore-trailer for supporting a first end of the load, said fore-trailer comprising a first wheel assembly and being supported by at least the load bearing wheels of the prime mover and said first wheel assembly;

dolly means for supporting and steering the second end of the load, said dolly means comprising a second wheel assembly and a third wheel assembly, said dolly means being supported by at least said second and third wheel assemblies, said dolly means further comprising drive means for providing rear drive propulsion of said steering dolly independent of the prime mover; and longitudinal means, located on said fore-trailer and said dolly means, for variably distributing the weight of the load upon the load bearing wheels of the prime mover and said wheel assemblies.

7. The trailer assembly of claim 6 wherein said dolly means further comprises steering means for providing full turning control of said aft-trailer.

8. A trailer assembly for supporting the weight of a load and for transporting the load over a highway, said trailer assembly being releasably coupled to a prime mover having load a fore-trailer for supporting a first end of the load, said fore-trailer comprising a first wheel assembly and being supported by at least the load bearing wheels of the prime mover and said first wheel assembly;

dolly means for supporting and steering the second end of the load, said dolly means comprising a second wheel assembly and a third wheel assembly and said dolly means being supported by at least said second and third wheel assemblies, said dolly means further comprising at least a fifth wheel assembly, and a vertical adjustment means for alternately lowering and raising said fifth wheel assembly in order to alternately support said dolly means;

longitudinal adjustment means, located on said fore-trailer and said dolly means, for variably distributing the weight of the load upon the load bearing wheel assemblies, said longitudinal adjustment means comprising first load transfer means for pivotally connecting the first end of the load to said fore-trailer at any of a plurality of longitudinally spaced positions on said fore-trailer, and second load transfer means for pivotally connecting the second end of the load to said dolly means at any of a plurality of longitudinally spaced positions on said dolly means;

said longitudinal adjustment means further comprising first longitudinally adjustable pivotal coupling means for supportively coupling said fore-trailer to the prime mover at any of a plurality of longitudinally spaced coupling positions on said fore-trailer;

first coupling means including a first fifth wheel providing pivotal support of said fore-trailer on the prime mover;

said first wheel assembly comprising a first distribution means for adjusting the weight distribution of the load between the prime mover and said fore-trailer; and said dolly means comprising dolly distribution means for adjusting the weight distribution of the load between at least said second and third wheel assemblies.

9. The trailer assembly of claim 8 wherein said dolly means further comprises motor means for maneuvering the rear end of the load.

10. The trailer assembly of claim 9 wherein said dolly means further comprises rear console means for controlling said dolly means, said console means including first control means for steering said dolly means, second control means for operating said vertical adjustment means and third control means for operating said motor means.

11. A trailer assembly for supporting the weight of a load and for transporting the load over a highway, said trailer assembly being releasably coupled to a prime mover having load bearing wheels, said trailer assembly comprising:
- a fore-trailer releasably coupled to the prime mover, said fore-trailer comprising a first gooseneck and a first longitudinally adjustable wheel assembly, said first gooseneck having a first plurality of king pin positions to effect pivotal coupling of said fore-trailer to the prime mover in a longitudinally adjustable manner, said fore-trailer supporting a first end of the load;
- an aft-trailer for supporting a second end of the load, said aft-trailer comprising a second gooseneck, at lease a second longitudinally adjustable wheel assembly for supporting said aft-trailer and a rear driver console;
- a steerable dolly for supporting said aft-trailer, said steerable dolly comprising a steerable wheel assembly, a vertically adjustable wheel assembly and at least a third longitudinally adjustable wheel assembly, said third longitudinally adjustable wheel assembly comprising drive wheels wherein said steerable wheel assembly and said drive wheels are remotely controllable from said rear driver console, said second gooseneck having a second plurality of king pin positions to effect pivotal coupling of said steerable dolly to said aft-trailer in a longitudinally adjustable manner;
- fastening means for securing first and second ends of the load to said trailer assembly;
- first longitudinally adjustable coupling means for longitudinally adjusting the position of the first end of the load on said fore-trailer, comprising a first pivotal coupling plate, a first pin and a first plurality of bolting flanges;
- second longitudinally adjustable coupling means for longitudinally adjusting the position of the second end of the load on said aft-trailer comprising a second pivotal coupling plate, a second pin and a second plurality of bolting flanges; and said dolly means comprising steering means for providing full turning control of said aft-trailer, said dolly means further comprising drive means for providing rear drive propulsion of said steering dolly independent of the prime mover.

* * * * *